United States Patent [19]
Nishino et al.

[11] Patent Number: 5,935,468
[45] Date of Patent: *Aug. 10, 1999

[54] INSULATED ELECTRICALLY HEATED POT AND MANUFACTURING METHOD THEREFOR

[75] Inventors: Yoshiya Nishino; Masashi Yamada; Seiichi Ito, all of Tokyo, Japan

[73] Assignee: Nippon Sanso Corporation, Tokyo, Japan

[*] Notice: This patent is subject to a terminal disclaimer.

[21] Appl. No.: 08/905,067

[22] Filed: Aug. 1, 1997

Related U.S. Application Data

[63] Continuation of application No. 08/507,421, filed as application No. PCT/JP94/02200, Dec. 26, 1994, Pat. No. 5,712,465.

[30] Foreign Application Priority Data

Dec. 28, 1993 [JP] Japan ................................. 5-350343

[51] Int. Cl.$^6$ .......................... A47J 27/21; A47G 23/04
[52] U.S. Cl. ....................... 219/438; 219/439; 220/422
[58] Field of Search .................................. 219/385–387, 219/429, 430, 438, 439; 220/422

[56] References Cited

U.S. PATENT DOCUMENTS

| | | | |
|---|---|---|---|
| 3,725,645 | 4/1973 | Shevlin | 219/387 |
| 3,764,780 | 10/1973 | Ellis | 219/430 |
| 3,940,589 | 2/1976 | Tupper | 219/433 |
| 4,234,783 | 11/1980 | Aoshima | 219/441 |
| 4,241,288 | 12/1980 | Aoshima et al. | 219/441 |
| 4,441,016 | 4/1984 | Oota et al. | 219/441 |
| 4,517,445 | 5/1985 | Tatsumi et al. | 219/438 |
| 4,672,179 | 6/1987 | Onishi et al. | 219/441 |
| 4,713,522 | 12/1987 | Kimura | 219/202 |
| 4,801,782 | 1/1989 | Ineson | 219/438 |
| 5,643,485 | 7/1997 | Potter et al. | 219/430 |
| 5,706,969 | 1/1998 | Yamada et al. | 220/422 |
| 5,712,465 | 1/1998 | Nishino et al. | 219/438 |

FOREIGN PATENT DOCUMENTS

| | | |
|---|---|---|
| 0170409 A1 | 2/1986 | European Pat. Off. . |
| 2361850 | 3/1978 | France . |
| 3220268 C1 | 11/1983 | Germany . |
| 3337200 A1 | 5/1985 | Germany . |
| 53-109170 | 9/1978 | Japan . |
| 6-273836 | 5/1987 | Japan . |
| 231190 | 9/1988 | Japan . |
| 220970 | 6/1990 | Japan . |
| 1272748 | 5/1972 | United Kingdom . |
| WO 85/03422 | 8/1985 | WIPO . |

Primary Examiner—Jospeh Pelham
Assistant Examiner—J. Pelham
Attorney, Agent, or Firm—Fish & Richardson P.C.

[57] ABSTRACT

The present invention relates to an insulated electrically heated pot which is provided with an insulated container and an electric heating apparatus disposed therewithin, into which insulated container a liquid such as water or the like is introduced and heated, and the temperature thereof is maintained, as well as to a manufacturing method therefor. In the insulated electrically heated pot in accordance with the present invention, at least one gas having a low conductivity selected from the group consisting of xenon, krypton, and argon is made to fill the insulating layer of the insulated container.

4 Claims, 2 Drawing Sheets

INSULATED ELECTRICALLY HEATED POT AND MANUFACTURING METHOD THEREFOR

CROSS-REFERENCE TO RELATED CASES

This is a continuation application of U.S. application Ser. No. 08/507,421 filed Aug. 25, 1995, now U.S. Pat. No. 5,712,465, which is a 371 of PCT/FP94/02200, filed Dec. 26, 1994.

TECHNICAL FIELD

The present invention relates to an insulated electrically heated pot which is provided with an insulated container and an electric heating apparatus disposed therewithin; a liquid such as water or the like is placed within the insulated container, and the temperature of the hot water is maintained.

BACKGROUND ART

In general, insulated electrically heated pots have a structure provided with a container having a double-walled structure in which an inner container and an outer container are joined and made unitary at the openings thereof, the space between the inner and outer containers being placed in a vacuum state; and a heater unit for heating the liquid stored within the inner container by means of heat transfer.

FIG. 2 shows, as an example of a conventional pot for boiling water, the pot described in Japanese Utility Model, First Publication, No. Sho 62-73836; this water boiling pot 1 has a structure in which a heater unit 3 is affixed to the inner bottom surface of a container 2 having a vacuum double-walled structure in a water-tight manner by means of packings 4 and 5.

However, the conventional vacuum insulated water boiling pot shown in FIG. 2 above has a structure in which the space between the inner container and the outer container is placed in a vacuum state, so that atmospheric pressure is constantly placed on the double-walled container, and in order to disperse this force, a form having curved surfaces is necessary, and as a result, it is generally necessary to provide an inner container and an outer container with a cylindrical form having a bottom, and as a result of employing such a form, there is a problem in that the proportion of the inner capacity with respect to the outer capacity of the outer container, that is to say, the capacity efficiency, is low.

DISCLOSURE OF THE INVENTION

The present invention was created in light of the above circumstances; it has as an object thereof to provide an insulated electric heated pot in which the insulation performance of the container is high, and moreover, one in which the container has a shape which increases the capacity efficiency.

In a first aspect of the present invention, an insulated electrically heated pot is provided with an insulated container in which an inner container and an outer container are made unitary at the openings thereof, the space between these inner and outer containers being made an insulating layer, and an electric heating apparatus for heating a liquid stored within the inner container; the insulating layer of the insulated container is filled with at least one type of gas having a low heat conductivity selected from among xenon, krypton, and argon.

The electric heating apparatus can be located on a surface of the inner container and inside the insulating layer.

Various implementations of the invention can include one or more of the following features. The filling pressure of the gas can be in the range of 300–700 Torr. Also, a plurality of insulating layers of the insulated container can be provided to form a layered insulating structure. In addition, the insulated container can be an angular insulated container having a flat-walled structure.

In a second aspect of the present invention, a manufacturing method is provided for insulated electrically heated pots provided with an insulated container in which an inner container and an outer container are made unitary at the openings thereof, the space between these inner and outer containers being made an insulating layer, and an electric heating apparatus for heating a liquid stored within the inner container; the inner container and the outer container are made unitary at the openings thereof, a double-walled container having a filling port at one or the other of the inner and outer containers is thus formed, and the space between the inner and outer containers of the double-walled container is placed in a vacuum state, and then, at the time of the formation of an insulation layer by placing at least one type of gas having a low heat conductivity selected from xenon, krypton, and argon within the space via the filing port, sealing this filling port, and thus filling the space between the inner and outer containers with a gas having a low heat conductivity, an insulating layer formation procedure is conducted such that the outer pressure on the double-walled container and the pressure in the space between the inner and outer containers is made approximately equal.

The insulated electrically heated pot in accordance with the present invention is formed with an insulating layer in which, in place of the vacuum sealing of the space between the inner and outer containers, this space is filled with a gas having a low heat conductivity, such as xenon, krypton, argon, or the like, so that the process of formation of the insulating layer is extremely simple, the manufacturing procedure can be simplified, and production costs can also be lowered. Moreover, by means of the adjusting the filling gas pressure of the gas having a low heat conductivity, it is possible to reduce the difference in pressure with the outside atmosphere, so that it is possible to produce an anguled container having a structure with flat walls. Furthermore, by means of layering insulation, where necessary, it is possible to increase the insulation performance, and it is possible to obtain performance equal to or superior to that of vacuum insulation.

Furthermore, in the manufacturing method for an insulated electrically heated pot in accordance with the present invention, by means of conducting an insulating layer formation procedure wherein an inner container and an outer container are made unitary at openings thereof, a double-walled container having a filling port in one or the other of the inner or outer containers is thus formed, the space between the inner and outer containers in this double-walled container is placed in a vacuum state, and next, when placing one or more gasses having a low heat conductivity selected from gas having a low heat conductivity, such as xenon, krypton, argon, within the space via the filling port, sealing the filling port, and thus filling the space between the inner and outer containers with a gas having a low heat conductivity to form the insulating layer, the external pressure on the double-walled container and the pressure in the space between the inner and outer containers is made approximately equal, it is possible to prevent the deformation of the double-walled container as the result of the application of external pressure, and it is possible to produce an insulated container using angular containers having a flat-walled structure.

BEST MODE FOR CARRYING OUT THE INVENTION

Figure 1:
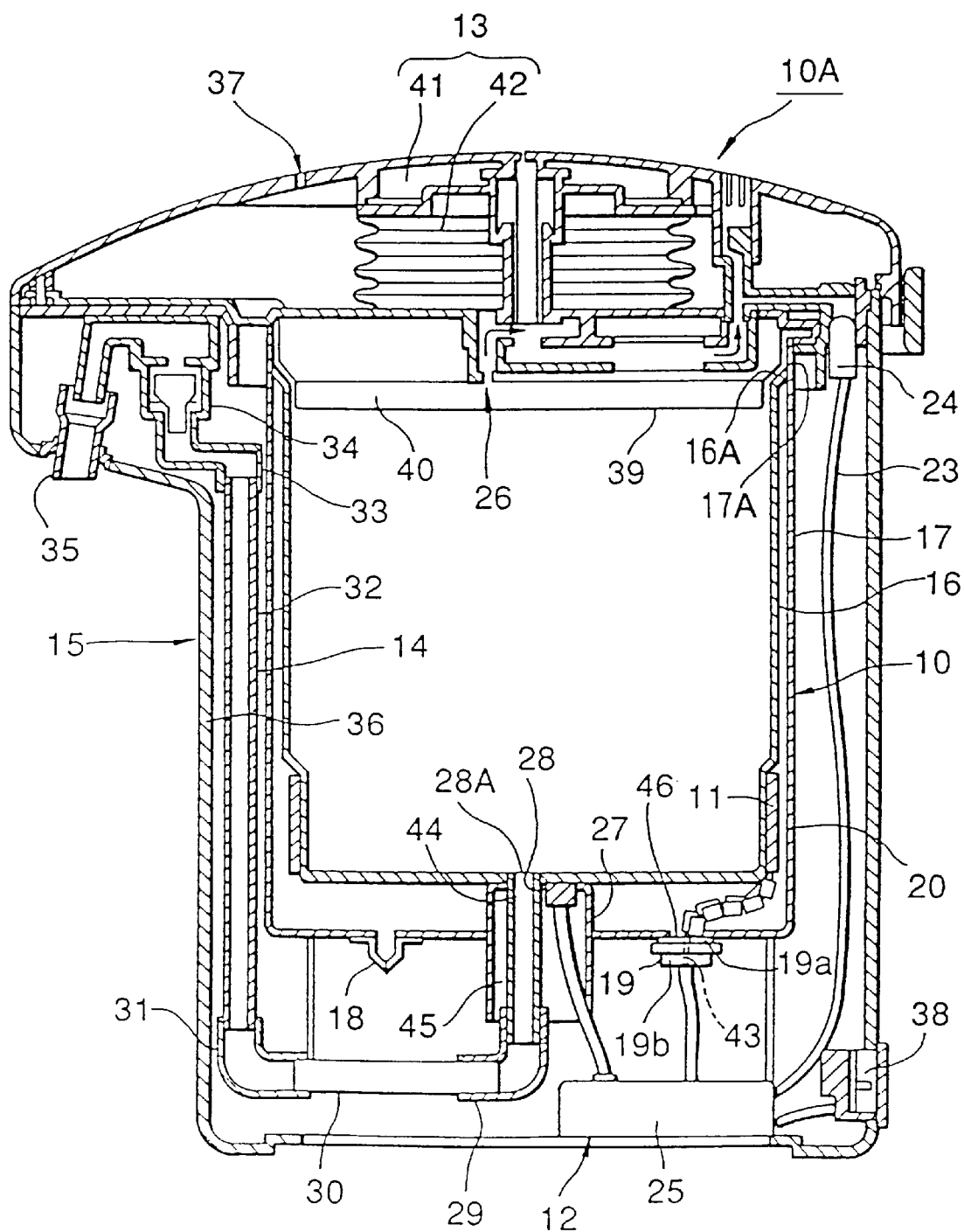
FIG. 1 is a side cross sectional view showing an embodiment of the insulated electrically heated pot in accordance with the present invention.
Figure 2:
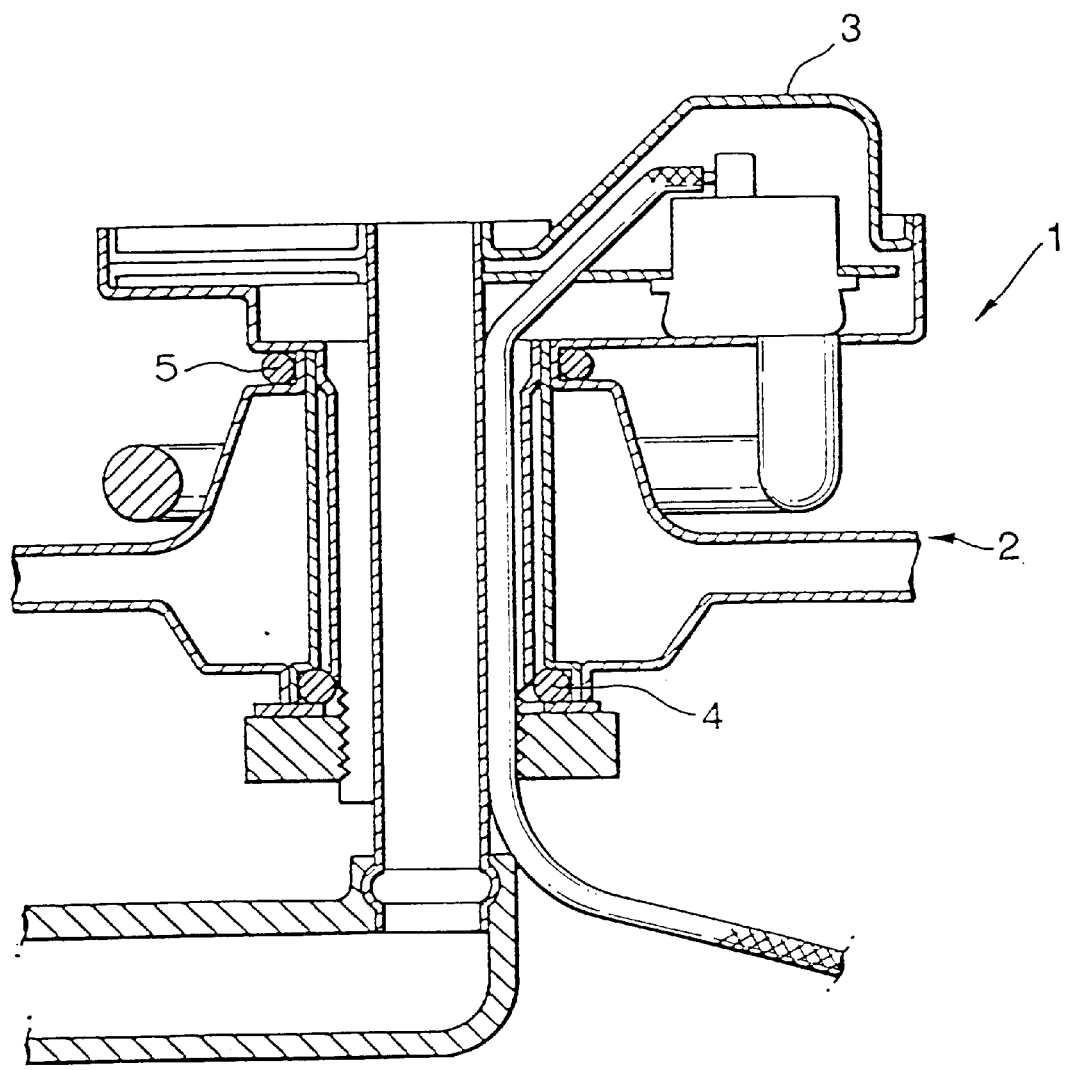
FIG. 2 is a cross sectional view of the main parts showing an example of a conventional electric pot.

FIG. 1 shows an embodiment of an insulated electrically heated pot in accordance with the present invention. In the Figure, reference 10A indicates an insulated electrically heated pot (hereinbelow referred to as an "electric pot").

This electric pot 10A has a structure which is provided with an angled-tubular-shaped insulated container 10, a heater 11 which is disposed within this angular insulated container 10, a heating control apparatus 12 which is disposed below the angular insulated container 10, a pressurizing apparatus 13 which is provided above the angular insulated container 10, a water injection apparatus 14 having tube shape which is connected to the angular insulated container 10, and an outer container 15 within which this is contained.

This angular insulted container 10 is an insulated container having a double-walled structure which is formed by joining and making unitary an inner container 16 having an angled tubular shape possessing a bottom and comprising a metal such as stainless steel or the like, and an outer container 17 which is slightly larger than this inner container at the openings thereof, filling a space between these inner and outer containers 16 and 17 with a gas having a low heat conductivity, for example, krypton, xenon, argon, or the like, and more preferably one or the other of krypton or xenon, or a mixture of gasses thereof, via a gas input tube 18 and at a pressure at room temperature (20° C.) within a range of 300–700 Torr, and preferably of approximately 400 Torr, applying the gas input tube 18, and thus forming an insulating space layer 20.

A heater 11 is disposed at the side wall of the inner container 16 in the vicinity of the bottom thereof on the same side as the insulating space layer 20. A strip-shaped mica heater in which a metallic electric heating wire such as a NICHROME wire or the like is wrapped around plate-shaped mica or the like, for example, is used as this heater 11. Both ends of this heater 11 are attached via screws or springs, and the heater is thus attached with the surface thereof in contact with the lower portion of the side surface of the inner container 16. This heater 11 is connected to the heating control apparatus 12 via a lead wire 23.

Heating control apparatus 12 has a structure which is provided with a water temperature detection sensor 24 (hereinbelow termed a "thermistor"), and a microcomputer 25 (hereinbelow termed a "temperature control mechanism") for receiving the temperature change signals detected by the thermistor 24 and conducting temperature control.

To explain the operation of this temperature control mechanism 25, first, water is placed in the electric pot 10A, the power switch is turned on, and then power is supplied to heater 11, and the water within electric pot 10A is heated. When the water temperature within electric pot 10A approaches 100° C., the steam generated within electric pot 10A passes through a steam path 26 and reaches the thermistor 24. Thermistor 24 detects the change in temperature within electric pot 10A by means of this steam. This change in temperature is sent as an electrical signal to temperature control mechanism 25, and at this point, the temperature control mechanism 25 detects that boiling has occurred, and the power supply to heater 11 is cut off.

The temperature of water which has thus been boiled slowly decreases with the passage of a long period of time. At this time, the temperature control mechanism 25 again resumes power supply to heater 11 when the temperature of the water falls below a previously established temperature (for example, approximately 90° C.). The amount of power supplied at this time is an amount of power for temperature maintenance which is established in advance in the temperature control mechanism 25 (for example, approximately 30 Wh).

A water injection apparatus 14 comprising a tubular path, one end of which is connected to the inner container 16, and the other end of which is positioned in the vicinity of the upper end of the angular insulated container 10, is provided at the outer side of the angular insulated container 10. This water injection apparatus 14 has a structure which is provided with a water conduction tube 30, which is provided via a connecting tube 29 at the other end of an extraction tube 28, which is connected to a hole provided in a recessed manner in the center of the bottom of inner container 16, and which passes through a communicating tube 27 which penetrates the bottom of outer container 17 and is connected to the bottom of inner container 16, a water injection tube 32, which is connected via a connecting tube 31 to the other end of this water conduction tube 30, and opening and closing valve 34, which is provided via a connecting tube 33 at the other end of the water injection tube 32, and a nozzle 35 which is provided so as to be connected to the opening and closing valve 34.

The angular insulated container 10 having the structure described above is contained and disposed within an outer decorative container 15. This outer decorative container 15 comprises a body 36 within which the angular insulated container 10 itself is stored, and a lid 37, within which the pressurizing apparatus 13 is stored. A socket port 38 for the introduction of an external (domestic) power source is provided in the lower side surface of the body 36, and this socket port 38 is provided so as to be connected to the unit of the temperature control mechanism 25 which is disposed in the immediate vicinity thereof.

Furthermore, lid 37 comprises a pressurizing apparatus 13 and a lid unit 40 which closes the upper opening 39 of the angular insulated container 10. Pressurizing apparatus 13 comprises a pressing plate 41 and a bellows 42; by means of pressing the pressing plate 41, the air within the angular insulated container 10 is pressurized and compressed, and by means of this, the hot water within angular insulated container 10 passes through a path comprising extraction tube 28, connecting tube 29, water conduction tube 30, connecting tube 31, water injection tube 32, connecting tube 33, and opening and closing valve 34, and is emitted from nozzle 35.

Next, an example of the manufacture of this insulated electrically heated pot 10A will be explained.

First, a metal such as stainless steel or the like is formed into an angular pipe shape, and the inner container 16 is produced. At this time, in order to position the heater, a step is provided which slightly shortens the diameter at the bottom side surface. One end of an extraction tube 28 is welded to an extraction hole 44 in the bottom of the inner container 16, and then the end of a communicating tube 27 is welded to the bottom of the inner container 16. After this, a heater 11 is wrapped around the step of the inner container 16, both ends of the heater 11 are fixed with screws, or with springs, and the surface thereof is brought into contact with the inner container 16.

Next, the outer container 17 is produced by forming a metal such as stainless steel or the like in a manner similar to that of the inner container 16. At the time of this molding, a communication hole 45 for providing the communicating tube 27, a gas filling tube 18, and a hole 46, through which the NICHROME wire of the heater 11 is passed, are provided in the bottom of the outer container 17. Next, the opening 16A of the inner container 16 and the opening 17A of the outer container 17 are welded in a gas-tight manner and made unitary, and furthermore, the portions of the communicating tube 27 which are in contact with the peripheral portion of the communicating hole 45 provided in the bottom of the outer container 17 are welded.

Next, the hole 46 is sealed using a hermetic material 19. This hermetic material 19 comprises an insulating material, and the structure is one in which two sealing members 19a and 19b having a cylindrical shape and provided with a bottom which are provided with conducting parts 43 in two spots are engaged. Next, the NICHROME wires of the heater 11 are connected by means of solder or the like to the conducting parts 43 of the upper sealing member 19a, respectively. At this time, the NICHROME wires are covered in an insulating material such as a cladding or the like, so that the nichrome wires do not touch each other, and furthermore do not touch the inner and outer container 16 and 17, so as to prevent short-circuits. After this, this sealing member 19a is caused to adhere to the outer surface of the bottom of the outer container 17 using an epoxy-type adhesive, and hole 46 is sealed in an air-tight manner.

Next, the space formed between the inner and outer containers 16 and 17 of the container having a double-walled structure (hereinbelow referred to as a "double-walled container") produced as described above, is subjected to vacuum evacuation via gas filling tube 18, and after this, at least one type of gas having low heat conductivity selected from krypton, xenon, and argon is introduced at a predetermined pressure (for example, 400 Torr at 20° C.), and this is made a low-heat conductivity insulating space layer, and after this, gas filling tube 18 is pressured-applied using a pressing machine of the hydraulic type or the like, and the low heat conductivity insulating space layer is sealed. By means of this, an insulating layer 20 is formed in the space between the inner and outer containers 16 and 17 of the double container, and the insulated container 10 is formed.

When forming this insulating layer 20, the above-described vacuum evacuation of the space between the inner and outer containers 16 and 17 so that the pressure within the space is approximately equivalent to the outer pressure on the double-walled container, and the filling of the gas having a low heat conductivity and the pressurized application (sealing) of the gas filling tube 18 are conducted, and thereby, the deformation of the double-walled container as a result of outside pressure is prevented, and it is possible to produce insulated containers with good yield using angular containers having a flat-walled structure. For example, even when placing the double-walled container in a reduced pressure chamber, connecting the gas filling tube 18 to an exterior vacuum pump, and conducting the vacuum evacuation of the space within the inner and outer containers 16 and 17, and when depressurizing the interior of the reduced pressure chamber so as to have an approximately equivalent pressure to that of the vacuum evacuation, and introducing a gas having a low heat conductivity via gas filling pipe 18, the gas pressure within the reduced pressure chamber is regulated so as to be approximately equivalent to that of the space between the inner and outer container 16 and 17, and the gas filling tube 18 of the double-walled container is sealed. Furthermore, as a separate method, the entirety of the double-walled container is placed within a reduced pressure chamber, the interior of this chamber is subjected to vacuum exhaust, the space between the inner and outer containers 16 and 17 is also subjected to vacuum exhaust, and next, a gas having a low heat conductivity is introduced into the reduced pressure chamber so as to attain a given pressure, and the double-walled container is sealed.

Next, the sealing member 19b (hermetic member) below the sealing member 19a which is attached to the outer container 17 is engaged, and is connected to the temperature control mechanism 25 via lead wire 23.

Next, one end of the water conduction tube 30 is attached to the other end of the extraction tube 28 via the connecting tube 29, one end of the water injection tube 32 is attached to the other end of the water conduction tube 30 via a connecting tube 31, and opening and closing valve 34 is connected to the other end of the water injecting tube 32 via a connecting tube 33, and a nozzle 35 is attached to this opening and closing valve 34.

Finally, the angular insulated container 10 obtained in this manner is placed within an outer decorative container 15, this is installed, and the electric pot 10A shown in FIG. 1 is thus produced.

In this electric pot 10A, the insulating layer 20 is not in a vacuum state, but rather, this layer is such that a gas having a low conductivity such as xenon, krypton, or the like is introduced at a pressure of a level such that the insulated container will not collapse as a result of the atmospheric pressure, and thereby, the degree of freedom of the shape of insulated container increases, and it is possible to produce insulated containers in which the inner container 16 and the outer container 17 have approximately a square columnar shape.

In the foregoing embodiment, a thermistor 24 and a temperature control mechanism 25 were employed in the heating control apparatus 12; however, it is not necessary that this control apparatus employ a thermistor 24 and a temperature control mechanism 25, so that for example, control mechanisms such as a thermal read switch (TRS), a relay, a thermostat, or an auxiliary heater, or the like may be employed.

Furthermore, where necessary, by means of providing a plurality of insulating layers 20 and thus creating a layered insulating structure, it is possible to increase the insulation performance and to obtain a performance superior to that of vacuum insulation.

Furthermore, in the foregoing embodiment, the sealing of the insulated container 10 was conducted by means of pressure-constricting (pinching-off and sealing) the gas filling tube 18; however, the exhaust port provided in the outer container may be sealed by means of a sealing plate, or an exhaust hole having the shape of a small hole or a narrow groove may be sealed by means of a low temperature brazing material.

As described above, the insulated electrically heated pot in accordance with the present invention is provided with an insulated container having an insulating layer which is filled with a gas having a low heat conductivity such as xenon, krypton, or the like at such a level of pressure that the insulated container does not collapse as a result of atmospheric pressure, so that the insulating layer production process is extremely simple, the manufacturing processes can be simplified, and it is possible to reduce the manufacturing costs. Moreover, by means of regulating the filling gas pressure of gas having a low heat conductivity, it is possible to reduce the difference in pressure with atmospheric pressure, so that it is possible to produce angular containers having a flat-walled structure. Furthermore, where necessary, by means of layered insulation, it is possible to improve the insulation performance, and to obtain a performance superior to that of vacuum insulation.

Additionally, in the manufacturing method for insulated electrically heated pots in accordance with the present invention, when forming the insulating layer of the above-described insulated container, an insulating layer formation process is conducted in which the external pressure on the double-walled container and the pressure in the space between the inner and outer containers is approximately equalized, and thereby, the deformation of the double-walled container as a result of external pressure is prevented, and it becomes possible to produce insulated containers using angular containers having a flat-walled structure, and it is possible as a result to increase the volume efficiency.

What is claimed is:

1. An insulated electrically heated pot comprising an insulated container in which openings of an inner container and an outer container are made unitary, and a space between the inner and outer containers is made an insulating layer, and an electric heating apparatus which heats a liquid is stored within the inner container,
   wherein the insulating layer of the insulated container is filled with at least one gas having a low heat conductivity selected from the group consisting of xenon, krypton and argon, and
   wherein the electric heating apparatus is located on a surface of the inner container and inside the insulating layer.

2. An insulated electrically heated pot according to claim 1, wherein the filling pressure of the gas having a low heat conductivity is within a range of 300–700 Torr.

3. An insulated electrically heated pot according to claim 1, wherein a plurality of insulating layers of the insulated container are provided to form a layered insulating structure.

4. An insulated electrically heated pot according to claim 1, wherein the insulated container is an angled-tubular-shaped insulated container having a flat-walled structure.

* * * * *